United States Patent
Yang

(10) Patent No.: US 12,414,194 B2
(45) Date of Patent: Sep. 9, 2025

(54) DIRECT LINK DATA TRANSMISSION METHOD AND APPARATUS, AND STORAGE MEDIUM

(71) Applicant: Beijing Xiaomi Mobile Software Co., Ltd., Beijing (CN)

(72) Inventor: Xing Yang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 417 days.

(21) Appl. No.: 17/909,886

(22) PCT Filed: Mar. 13, 2020

(86) PCT No.: PCT/CN2020/079311
§ 371 (c)(1),
(2) Date: Sep. 7, 2022

(87) PCT Pub. No.: WO2021/179310
PCT Pub. Date: Sep. 16, 2021

(65) Prior Publication Data
US 2023/0098973 A1   Mar. 30, 2023

(51) Int. Cl.
*H04W 76/28*   (2018.01)
*H04W 72/30*   (2023.01)
*H04W 72/40*   (2023.01)

(52) U.S. Cl.
CPC .......... *H04W 76/28* (2018.02); *H04W 72/30* (2023.01); *H04W 72/40* (2023.01)

(58) Field of Classification Search
CPC ...... H04W 76/28; H04W 72/40; H04W 72/30
See application file for complete search history.

(56) References Cited

FOREIGN PATENT DOCUMENTS

| | | |
|---|---|---|
| CN | 107241786 A | 10/2017 |
| CN | 108307489 A | 7/2018 |
| EP | 3442276 A | 2/2019 |
| WO | WO-2018064477 A1 * | 4/2018 |
| WO | WO 2018088840 A1 | 5/2018 |

OTHER PUBLICATIONS

International Search Report and Written Opinion of International Application No. PCT/CN2020/079311, mailed Dec. 7, 2020, 15 pages.
European Patent Office, Extended European Search Report issued in Application No. 20924964.8, Mar. 22, 2023, 10 pages.
Examination report for Indian Application No. 202247058057, issued Dec. 15, 2022, 6 pages.

* cited by examiner

Primary Examiner — Rhonda L Murphy
(74) Attorney, Agent, or Firm — Finnegan, Henderson, Farabow, Garrett & Dunner, L.L.P.

(57) ABSTRACT

A sidelink data transmission method is performed by a first terminal and includes: receiving, from a second terminal, discontinuous reception (DRX) information of the second terminal; determining sidelink resources based on the DRX information; and transmitting sidelink data to the second terminal based on the sidelink resources.

17 Claims, 8 Drawing Sheets

DIRECT LINK DATA TRANSMISSION METHOD AND APPARATUS, AND STORAGE MEDIUM

CROSS-REFERENCE TO RELATED APPLICATION

This application is a U.S. national phase application of International Application No. PCT/CN2020/079311, filed on Mar. 13, 2020, the content of which is hereby incorporated by reference in its entirety.

TECHNICAL FIELD

The disclosure relates to a field of communication technologies, and more particularly, to a sidelink data transmission method, a sidelink data transmission device and a storage medium.

BACKGROUND

In order to support sidelink communication between terminals, a sidelink communication mode is introduced. In the sidelink communication mode, a communication interface between a transmitting terminal and a receiving terminal is PC-5. According to a correspondence between the transmitting terminal and the receiving terminal, three sidelink transmission modes are supported, i.e. unicast, multicast and broadcast. The transmitting terminal transmits Sidelink Control Information (SCI) on the Physical Sidelink Control Channel (PSCCH). The SCI carries the resource locations of the transmitted data, the source identifier and the destination identifier. After receiving the SCI, the receiving terminal determines whether to receive corresponding data and determines corresponding processes according to the source identifier and destination identifier. In the unicast connection, each terminal corresponds to an individual identifier. In the multicast, each terminal can belong to one or more groups, and each group corresponds to an individual destination identifier. In the broadcast, all terminals correspond to one destination identifier.

The network device can configure one or more sidelink resource pools for the terminal through the broadcast or dedicated signaling to transmit the SCI and data. The sidelink resource pool is wireless resources that are continuous in the frequency domain and can be continuous or discontinuous in the time domain.

SUMMARY

According to a first aspect, there is provided a sidelink data transmission method applied to a first terminal, including: acquiring discontinuous reception (DRX) information transmitted by a second terminal; determining sidelink resources based on the DRX information; and transmitting sidelink data to the second terminal based on the sidelink resources.

According to a second aspect, a sidelink data transmission method applied to a second terminal is provided. The method includes: transmitting discontinuous reception (DRX) information of the second terminal to a first terminal; and receiving sidelink data transmitted by the first terminal on sidelink resources determined based on the DRX the information.

According to a third aspect, a sidelink data transmission method applied to a network device is provided. The method includes: determining discontinuous reception (DRX) information, in which the DRX information is transmitted by a second terminal to a first terminal; and configuring sidelink resources based on the DRX information, in which the sidelink resources are used for transmitting sidelink data by the first terminal to the second terminal.

According to a fourth aspect, a sidelink data transmission device is provided, including:
a processor; and a memory configured to store instructions executable by the processor; in which the processor is configured to perform a sidelink data transmission method described in the first aspect or any one of the implementations of the first aspect.

According to a fifth aspect, a non-transitory computer-readable storage medium is provided. When instructions in the storage medium are executed by a processor of a mobile terminal, the mobile terminal is caused to perform a sidelink data transmission method described in the first aspect or any one of the implementations of the first aspect.

According to a sixth aspect, a sidelink data transmission device is provided, including:
a processor; and a memory configured to store instructions executable by the processor; in which the processor is configured to perform a sidelink data transmission method described in the second aspect or any one of the implementations of the second aspect.

It is understandable that the foregoing general description and the following detailed description are examples and are explanatory only and are not limitations of the embodiments of the disclosure.

BRIEF DESCRIPTION OF THE DRAWINGS

The accompanying drawings, which are incorporated in and constitute a part of this specification, illustrate embodiments consistent with the disclosure and serve to explain the principles of the embodiments of the disclosure together with the description.

DETAILED DESCRIPTION

Embodiments will be described in detail herein, examples of which are illustrated in the accompanying drawings. In the following description related to the drawings, the same numerals in different drawings refer to the same or similar elements unless otherwise indicated. The implementations described in the following embodiments do not represent all implementations consistent with embodiments of the disclosure. Rather, they are merely examples of apparatus and methods consistent with some aspects of embodiments of the disclosure as recited in the appended claims.

Figure 1:
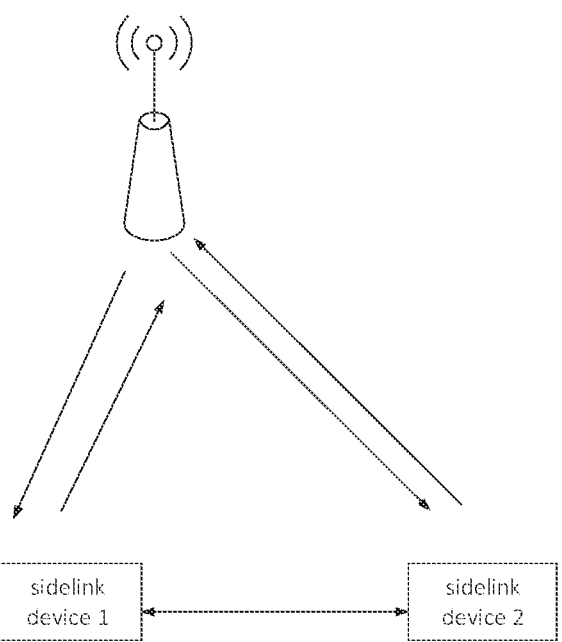
FIG. 1 is a schematic diagram illustrating communication system in accordance with an embodiment of the disclosure.

The sidelink communication method according to embodiments of the disclosure can be applied to a sidelink communication system illustrated in FIG. 1. As illustrated in FIG. 1, in a scenario where the sidelink communication is performed between sidelink terminals, the network device configures transmission parameters used to transmit data for the sidelink device 1. The sidelink communication device 1 serves as a data transmitting end, and the sidelink communication device 2 serves as a data receiving end. These two sidelink communication devices perform the sidelink communication. The link for the communication between the network device and the sidelink communication devices is the uplink and the downlink, and the link for the communication between the sidelink communication devices is the sidelink. The communication between the sidelink communication devices and other equipment can be transferred through a base station and a core network, that is, the uplink and the downlink between the terminal equipment and the base station in the original cellular network are used for communication, or the sidelink between the devices is used for communication. Compared with the Uu interface communication, the sidelink communication has characteristics of short delay and low overhead, and is suitable for the communication between the sidelink communication devices and other peripheral devices whose geographical locations are close to the geographical locations of the sidelink communication devices.

The disclosure relates to a scenario where the sidelink communication is performed between the sidelink communication devices, such as a scenario where the radio communication is performed between a vehicle and other nodes (V2X), where V represents an on-vehicle equipment and X represents an object interacting with the on-vehicle equipment. Currently, X mainly includes on-vehicle devices, handheld devices, traffic roadside infrastructure and networks. The V2X interaction modes include: interactions of Vehicle to Vehicle (V2V), Vehicle to Infrastructure (V2I), Vehicle to Pedestrian (V2P), Vehicle to Network (V2N). In the disclosure, the communication scenario of the sidelink communication between the sidelink communication devices may also be a Device to Device (D2D) communication scenario. The sidelink communication devices configured to perform the sidelink communication in embodiments of the disclosure may include various handheld devices, on-vehicle devices, wearable devices, computing devices, or other processing devices connected to wireless modems with wireless communication functions, as well as various forms of user equipment (UE), mobile stations (MS), terminals, terminal equipment and so on.

In order to save power consumption of the terminal, the network device can configure DRX parameters for the terminal. The DRX parameters include inactivity timer, on-duration timer, cycle, and start offset. The terminal can monitor the PDCCH only when the inactivity timer starts and during an on duration and not monitor the PDCCH channel at other times, thereby saving power consumption. Whenever the terminal receives, on the PDCCH, the Downlink Control Information (DCI) carrying its own Cell-Radio Network Temporary Identifier (C-RNTI), the inactivity timer will be started. The terminal will periodically start the on-duration timer.

After configuring the DRX for the receiving device on the sidelink, the transmitting terminal needs to transmit data in a wakeup window of the receiving terminal to enable the receiving terminal to receive the data transmitted by the transmitting terminal. When the transmitting terminal is in a sleeping state, transmitting data to the receiving terminal will cause data loss.

In view of this, embodiments of the disclosure provide a sidelink data transmission method, in which the receiving terminal transmits DRX information of the receiving terminal to the transmitting terminal. The transmitting terminal determines sidelink resources based on the DRX information of the receiving terminal, and transmits sidelink data to the receiving terminal based on the determined sidelink resources, which can prevent the transmitting terminal from transmitting the sidelink data when the receiving terminal is in a sleeping state, thereby avoiding data loss.

For ease of description, in embodiments of the disclosure, the transmitting terminal is referred to as the first terminal, and the receiving terminal is referred to as the second terminal.

Figure 2:
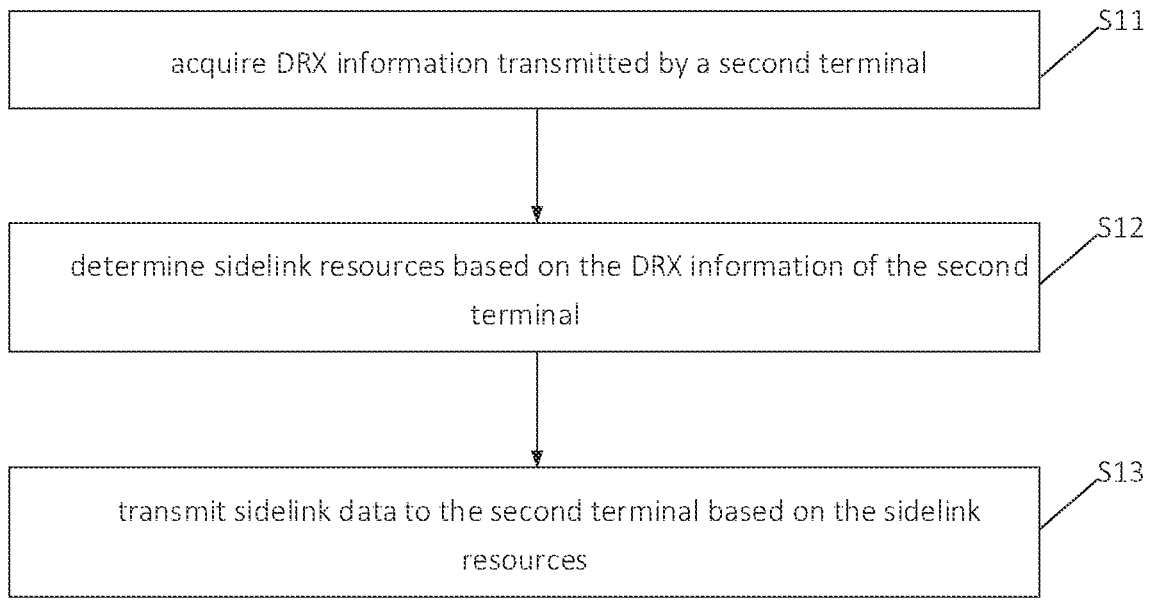
FIG. 2 is a flowchart illustrating a sidelink data transmission method in accordance with an embodiment of the disclosure.

FIG. 2 is a flowchart illustrating a sidelink data transmission method in accordance with an embodiment of the disclosure. As illustrated in FIG. 2, the sidelink data transmission method is applied to a first terminal. The method includes the following steps.

In step S11, DRX information transmitted by a second terminal is acquired.

In step S12, sidelink resources are determined based on the DRX information of the second terminal.

In step S13, sidelink data is transmitted to the second terminal based on the sidelink resources.

In embodiments of the disclosure, the first terminal that performs the communication by adopting the sidelink communication mode obtains the DRX information of the second terminal, and determines the sidelink resources for transmitting the sidelink data to the second terminal based on the DRX information of the second terminal, which can prevent the transmitting terminal from transmitting the sidelink data when the receiving terminal is in the sleeping state to avoid data loss.

Figure 3:
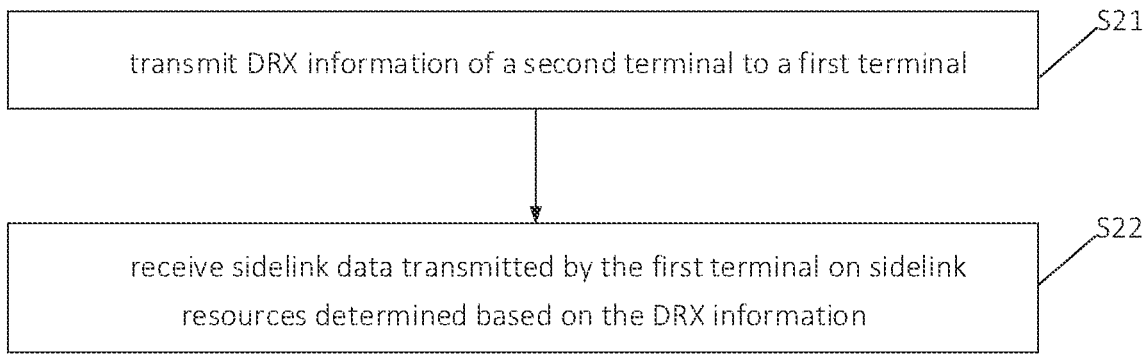
FIG. 3 is a flowchart illustrating a sidelink data transmission method in accordance with an embodiment of the disclosure.

FIG. 3 is a flowchart illustrating a sidelink data transmission method in accordance with an embodiment of the disclosure. As illustrated in FIG. 3, the sidelink data transmission method is applied to a second terminal. The method includes the following steps.

In step S21, DRX information of the second terminal is transmitted to a first terminal.

In step S22, sidelink data transmitted by the first terminal is received on sidelink resources determined based on the DRX information.

In embodiments of the disclosure, the second terminal that performs the communication by adopting the sidelink communication mode transmits the DRX information of the second terminal to the first terminal, and the first terminal determines, based on the DRX information of the second terminal, the sidelink resources for transmitting the sidelink data to the second terminal. The second terminal receives the sidelink data transmitted by the first terminal on the sidelink resources determined based on the DRX information, which can avoid data loss.

In embodiments of the disclosure, the sidelink data transmission method according to the above-mentioned embodiments will be described below in combination with practical applications.

In an implementation, for transmitting the DRX information by the second terminal to the first terminal, in embodiments of the disclosure, different ways can be adopted to transmit the DRX information to the first terminal depending on sidelink connection types where the DRX information is applicable. In one way, the DRX information is applicable to a sidelink unicast reception. In this situation, the second terminal can transmit the DRX information of the second terminal to the first terminal through a unicast message, that is, the second terminal transmits the DRX information applicable to the sidelink unicast reception to the first terminal based on the unicast message. The first terminal obtains the DRX information applicable to the sidelink unicast reception based on the unicast message transmitted by the second terminal. In another way, the DRX information is applicable to a sidelink multicast reception. In this situation, the second terminal can transmit the DRX information of the second terminal to a corresponding multicast group through a multicast message, that is, the second terminal transmits the DRX information applicable to the sidelink multicast reception to the first terminal based on a multicast message. The first terminal obtains the DRX information applicable to the sidelink multicast reception based on the multicast message transmitted by the second terminal. In still another way, the DRX information is applicable to all sidelink receptions. In this situation, the second terminal can transmit the DRX information of the second terminal through a broadcast message, that is, the second terminal transmits the DRX information applicable to all sidelink receptions to the first terminal based on the broadcast message. The first terminal obtains the DRX information applicable to all sidelink receptions based on the broadcast message transmitted by the second terminal.

In embodiments of the disclosure, the sidelink resources can be configured in different ways based on the state (such as a connected state, an idle state or an inactive state) of the first terminal. When the first terminal is in the connected state, the first terminal may report the DRX information and the sidelink identifier to the network device, and the network device configures the sidelink resources for transmitting the sidelink data by the first terminal to the second terminal based on the DRX information and the sidelink identifier. When the first terminal is in the idle state or in the inactive state, the first terminal may select the sidelink resources for transmitting the sidelink data by the first terminal to the second terminal from transmission resource pools broadcasted by the network device.

Further, in embodiments of the disclosure, the sidelink resources are configured in different ways based on the sidelink connection types where the DRX information of the second terminal is applicable and the state (such as the connected state, the idle state or the inactive state) of the first terminal.

In an implementation, when the first terminal is in the connected state and the DRX information is applicable to the sidelink unicast reception, the sidelink resources can be configured based on the DRX information and the sidelink identifier of the second terminal.

Figure 4:
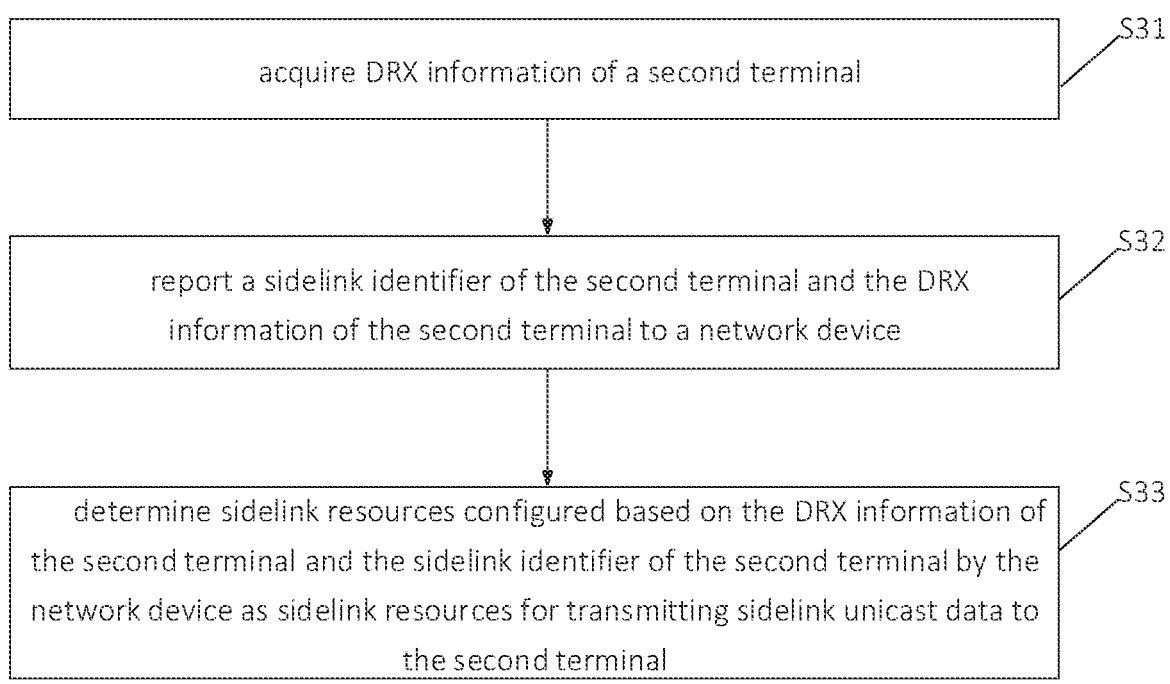
FIG. 4 is a flowchart illustrating a sidelink data transmission method in accordance with an embodiment of the disclosure.

FIG. 4 is a flowchart illustrating a sidelink data transmission method in accordance with an embodiment of the disclosure. As illustrated in FIG. 4, the sidelink data transmission method is applied to a first terminal and includes the following.

In step S31, DRX information transmitted by a second terminal is acquired.

The second terminal transmits DRX information applicable to a sidelink unicast reception to the first terminal based on a unicast message. The first terminal obtains the DRX information applicable to the sidelink unicast reception based on the unicast message transmitted by the second terminal.

In step S32, a sidelink identifier of the second terminal and the DRX information of the second terminal are reported to a network device.

In embodiments of the disclosure, after the first terminal in the connected state receives the DRX information applicable to a certain sidelink unicast connection transmitted by the second terminal, the first terminal reports the DRX information of the second terminal and the sidelink identifier of the second terminal to the network device, and the network device can configure the sidelink resources based on the DRX information of the second terminal and the sidelink identifier of the second terminal, to more reasonably configure, for the first terminal, the sidelink resources for transmitting the sidelink data to the second terminal.

The sidelink identifier of the second terminal involved in embodiments of the disclosure may be a sidelink Layer 1 identifier or a sidelink Layer 2 identifier.

Further, in embodiments of the disclosure, when the DRX information is applicable to the sidelink unicast reception, the DRX information may include DRX parameters such as an inactivity timer, an on-duration timer, a cycle, and a start offset.

In step S33, sidelink resources configured by the network device based on the DRX information of the second terminal and the sidelink identifier of the second terminal are used as sidelink resources for transmitting sidelink unicast data to the second terminal.

In an implementation, the first terminal is in the idle state or in the inactive state, and the DRX information of the second terminal is applicable to the sidelink unicast reception. A sidelink resource pool associated with the DRX information is selected from sidelink resource pools broadcasted by the network device as the sidelink resources for transmitting sidelink unicast data to the second terminal.

Figure 5:
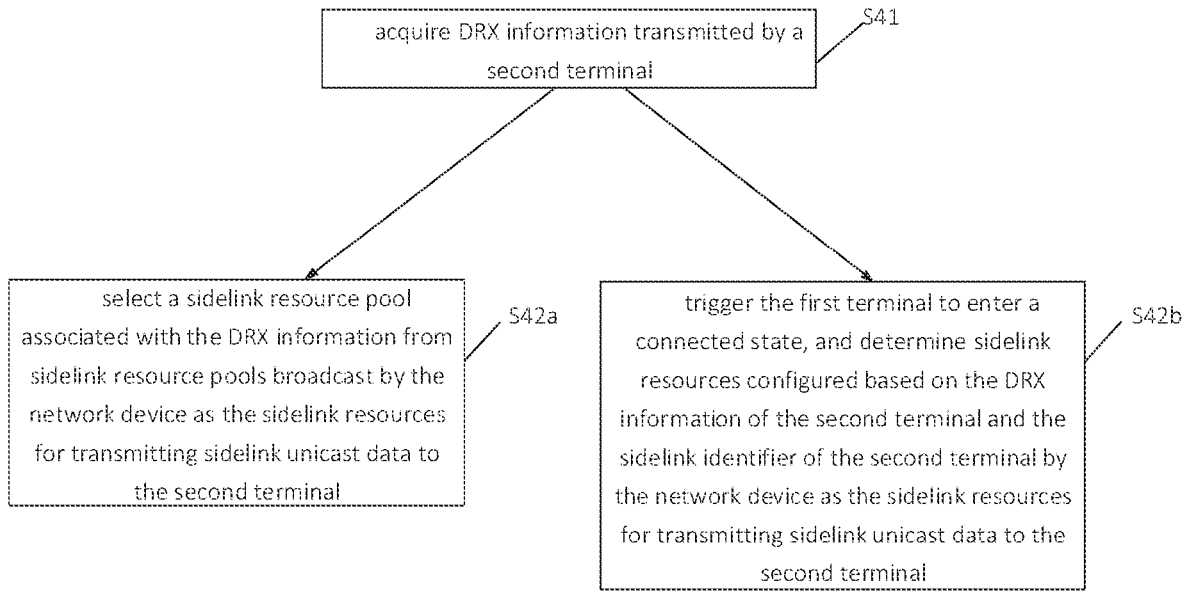
FIG. 5 is a flowchart illustrating a sidelink data transmission method according to an exemplary embodiment.

FIG. 5 is a flowchart illustrating a sidelink data transmission method in accordance with an embodiment of the disclosure. As illustrated in FIG. 5, the sidelink data transmission method is applied to a first terminal and includes the following.

In step S41, DRX information transmitted by a second terminal is acquired.

The second terminal transmits the DRX information applicable to a sidelink unicast reception to the first terminal based on a unicast message. The first terminal obtains the DRX information applicable to the sidelink unicast reception based on the unicast message transmitted by the second terminal.

In step S42a, a sidelink resource pool associated with the DRX information is selected from sidelink resource pools broadcasted by a network device as the sidelink resources for transmitting sidelink unicast data to the second terminal.

In embodiments of the disclosure, the network device may broadcast one or more sets of DRX parameters and one or more sidelink resource pools. Each sidelink resource pool is associated with at least one set of DRX parameters.

In embodiments of the disclosure, when there is a sidelink resource pool associated with the DRX information included in the sidelink resource pools broadcasted by the network device, the first terminal selects the sidelink resource pool associated with the DRX information from the sidelink resource pools broadcasted by the network device as the sidelink resources for transmitting the sidelink unicast data to the second terminal.

In another manner, when there is no sidelink resource pool associated with DRX information included in the sidelink resource pools broadcasted by the network device, the sidelink data transmission method according to embodiments of the disclosure further includes the following steps.

In S42b, the first terminal is triggered to enter the connected state, and sidelink resources configured, based on the DRX information of the second terminal and the sidelink identifier of the second terminal, by the network device are used as the sidelink resources for transmitting sidelink unicast data to the second terminal.

In an implementation, the first terminal is in the connected state and the DRX information of the second terminal is applicable to a sidelink multicast reception. The first terminal reports a sidelink identifier of a multicast group where the second terminal is in and multicast DRX information to a network device. The network device configures sidelink resources based on the sidelink identifier of the multicast group where the second terminal is in and the multicast DRX information. The first terminal uses the sidelink resources configured, based on the multicast DRX information and the sidelink identifier of the multicast group where the second terminal is in, by the network device as the sidelink resources for transmitting sidelink multicast data to the second terminal.

Figure 6:
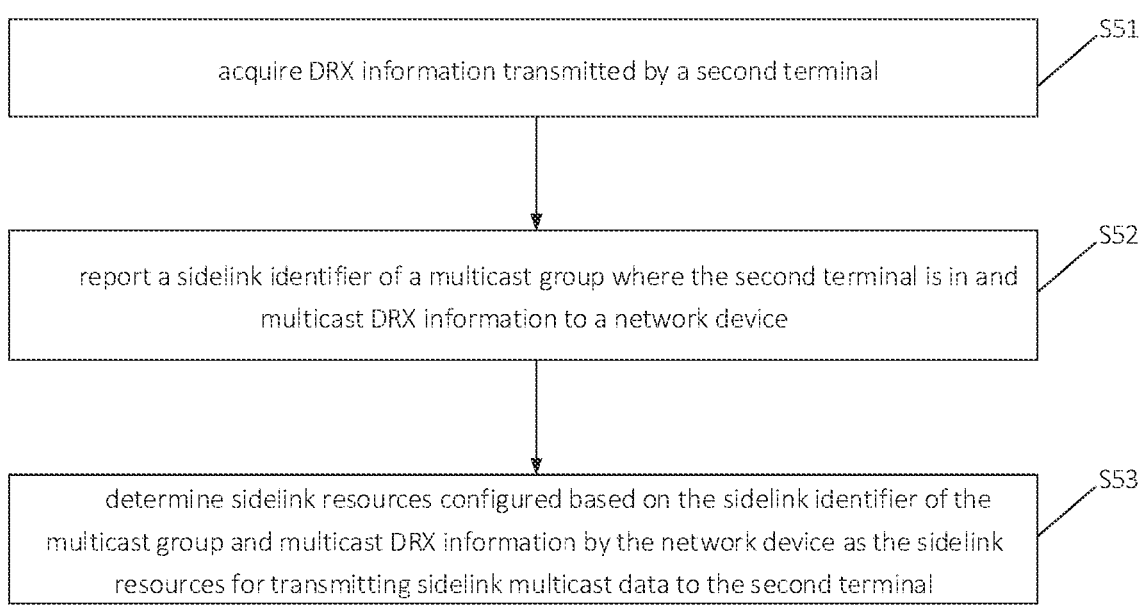
FIG. 6 is a flowchart illustrating a sidelink data transmission method in accordance with an embodiment of the disclosure.

FIG. 6 is a flowchart illustrating a sidelink data transmission method in accordance with an embodiment of the disclosure. As illustrated in FIG. 6, the sidelink data transmission method is applied to a first terminal and includes the following steps.

In step S51, DRX information transmitted by a second terminal is acquired.

The second terminal transmits the DRX information applicable to a sidelink multicast reception to the first terminal based on a multicast message. The first terminal obtains the DRX information applicable to the sidelink multicast reception based on the multicast message transmitted by the second terminal.

In step S52, a sidelink identifier of a multicast group where the second terminal is in and multicast DRX information are reported to the network device.

The first terminal reports the sidelink identifier of the multicast group where the second terminal is in and the multicast DRX information to the network device. The network device configures sidelink resources based on the sidelink identifier of the multicast group where the second terminal is in and the multicast DRX information.

In embodiments of the disclosure, after the first terminal in the connected state receives the DRX information applicable to a certain sidelink multicast connection transmitted by the second terminal, the multicast DRX information is used for the multicast data reception. The first terminal reports the sidelink identifier of the multicast group where the second terminal is in and the multicast DRX information to the network device, to allow the network device to configure sidelink resources based on the sidelink identifier of the multicast group where the second terminal is in and the multicast DRX information, to more reasonably configure the sidelink transmission resources for transmitting the sidelink data by the first terminal to the second terminal.

The sidelink identifier of the multicast group involved in embodiments of the disclosure may be a sidelink Layer 1 identifier or a sidelink Layer 2 identifier.

Further, when the DRX information is applicable to the sidelink multicast reception, in embodiments of the disclosure, the DRX information may include DRX parameters such as an inactivity timer, an on-duration timer, a cycle, and a start offset.

In step S53, sidelink resources configured by the network device based on the multicast DRX information and the sidelink identifier of the multicast group where the second terminal is in are used as the sidelink resources for transmitting sidelink multicast data to the second terminal.

In an implementation, the first terminal is in the idle state or the inactive state, and the DRX information is applicable to the sidelink multicast reception. The first terminal selects a sidelink resource pool associated with the multicast DRX information from the sidelink resource pools broadcasted by the network device as the sidelink resources for transmitting the sidelink multicast data to the second terminal.

Figure 7:
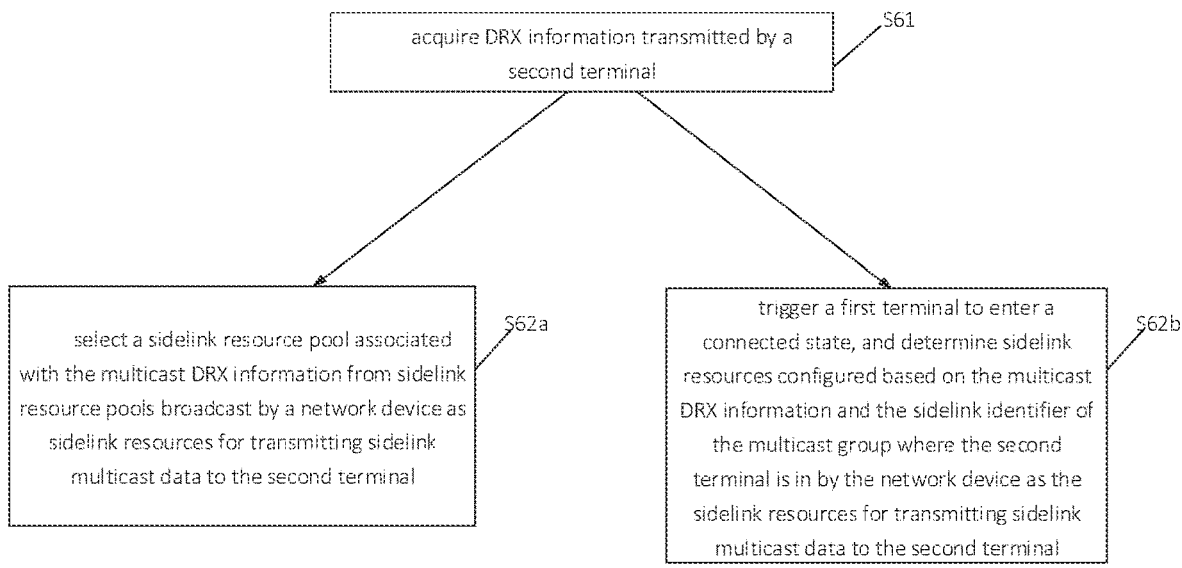
FIG. 7 is a flowchart illustrating a sidelink data transmission method in accordance with an embodiment of the disclosure.

FIG. 7 is a flowchart illustrating a sidelink data transmission method in accordance with an embodiment of the disclosure. As illustrated in FIG. 7, the sidelink data transmission method is applied to a first terminal and includes the following steps.

In step S61, DRX information transmitted by a second terminal is acquired.

The second terminal transmits DRX information applicable to a sidelink multicast reception to the first terminal based on a multicast message. The first terminal obtains the DRX information applicable to the sidelink multicast reception based on the multicast message transmitted by the second terminal.

In step S62a, a sidelink resource pool associated with multicast DRX information is selected from sidelink resource pools broadcasted by the network device as the sidelink resources for transmitting sidelink multicast data to the second terminal.

In embodiments of the disclosure, the network device may broadcast one or more sets of DRX parameters and one or more sidelink resource pools. Each sidelink resource pool is associated with at least one set of DRX parameters.

In embodiments of the disclosure, when there is a sidelink resource pool associated with the DRX information included in the sidelink resource pools broadcasted by the network device, the first terminal selects the sidelink resource pool associated with the DRX information from the sidelink resource pools broadcasted by the network device as the sidelink resources for transmitting sidelink multicast data to the second terminal.

In another manner, when there is no sidelink resource pool associated with DRX information included in the sidelink resource pools broadcasted by the network device, the sidelink data transmission method according to embodiments of the disclosure further includes the following steps.

In S62b, the first terminal is triggered to enter a connected state, and sidelink resources configured by the network device based on the multicast DRX information and the sidelink identifier of the multicast group where the second terminal is in are used as the sidelink resources for transmitting sidelink multicast data to the second terminal.

In an implementation, the DRX information of the second terminal is applicable to all sidelink receptions, and the first terminal determines whether a unicast connection is established with the second terminal. In one manner, if the first terminal and the second terminal have not established a unicast connection, the DRX information applicable to all sidelinks and the sidelink identifier of the second terminal are stored, and the DRX information applicable to all sidelinks is related to the sidelink of second terminal. In another manner, if the first terminal and the second terminal have established a unicast connection, the sidelink resources for transmitting sidelink unicast data to the second terminal are determined using the above DRX information applicable to the sidelink unicast reception.

Figure 8:
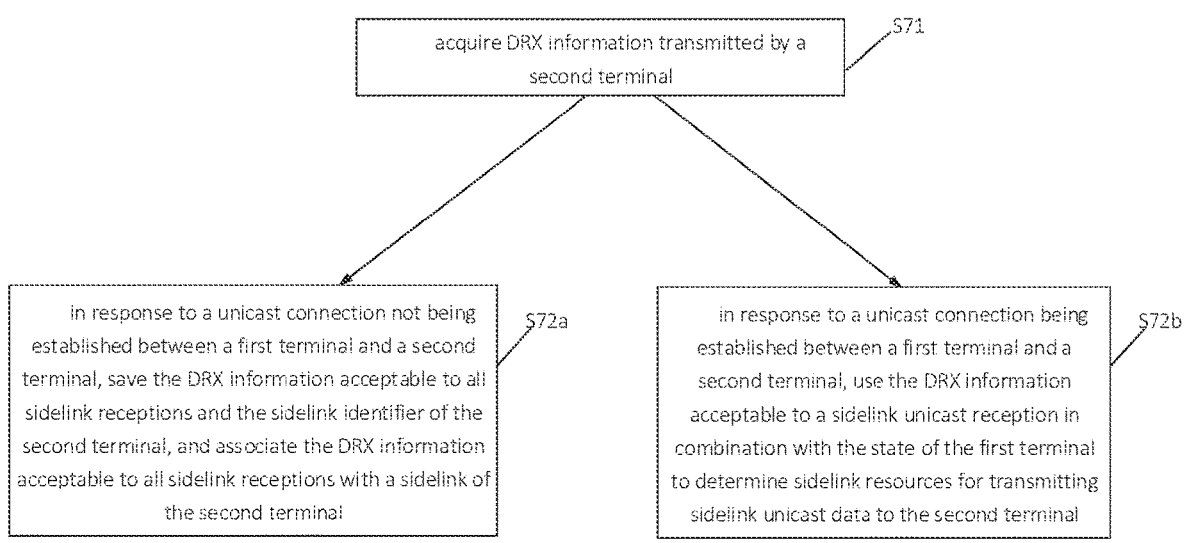
FIG. 8 is a flowchart illustrating a sidelink data transmission method in accordance with an embodiment of the disclosure.

FIG. 8 is a flowchart illustrating a sidelink data transmission method in accordance with an embodiment of the disclosure. As illustrated in FIG. 8, the sidelink data transmission method is applied to a first terminal and includes the following steps.

In step S71, DRX information transmitted by a second terminal is acquired.

The second terminal transmits the DRX information applicable to all sidelink receptions to the first terminal based on a broadcast message. The first terminal obtains the DRX information applicable to all sidelink receptions based on the broadcast message transmitted by the second terminal.

In step S72a, if the first terminal and the second terminal have not established a unicast connection, the DRX information applicable to all sidelinks and the sidelink identifier of the second terminal are stored, and the DRX information applicable to all sidelinks is related to the sidelink of the second terminal.

In step S72b, if the first terminal and the second terminal have established a unicast connection, the DRX information suitable for the sidelink unicast reception is used in combination with the state of the first terminal to determine the sidelink resources for transmitting sidelink unicast data to the second terminal.

In embodiments of the disclosure, if the first terminal and the second terminal have established a unicast connection and the first terminal is in a connected state, sidelink resources configured by the network device based on the DRX information applicable to all sidelinks and the sidelink identifier of the second terminal as the sidelink resources for transmitting the sidelink unicast data to the second terminal.

If the first terminal and the second terminal have established a unicast connection, and the first terminal is in the idle state or the inactive state, when there is a sidelink resource pool associated with the DRX information included in sidelink resource pools broadcasted by the network device, the first terminal selects the sidelink resource pool associated with the DRX information from the sidelink resource pools broadcasted by the network device as the sidelink resources for transmitting sidelink unicast data to the second terminal. When there is no sidelink resource pool associated with DRX information included in the sidelink resource pools broadcasted by the network device, the first terminal is triggered to enter the connected state, and sidelink resources configured by the network device based on the DRX information of the second terminal and the sidelink identifier of the second terminal are used as the sidelink resources for transmitting sidelink unicast data to the second terminal.

Figure 9:
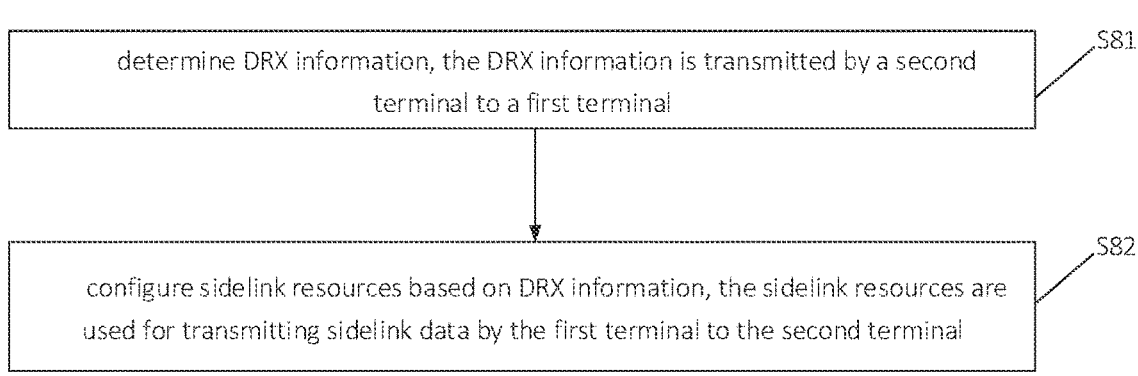
FIG. 9 is a flowchart illustrating a sidelink data transmission method in accordance with an embodiment of the disclosure.

FIG. 9 is a flowchart illustrated a sidelink data transmission method in accordance with an embodiment of the disclosure. As illustrated in FIG. 9, the sidelink data transmission method is applied to a network device and includes the following steps.

In step S81, DRX information is determined. The DRX information is transmitted by a second terminal to a first terminal.

In step S82, sidelink resources are configured based on the DRX information. The sidelink resources are used for transmitting sidelink data by the first terminal to the second terminal.

In an implementation, the first terminal is in a connected state, and the DRX information is applicable to a sidelink unicast reception. The network device can obtain a sidelink identifier of the second terminal and the DRX information of the second terminal reported by the first terminal. The network device configures the sidelink resources for transmitting the sidelink data by the first terminal to the second terminal based on the DRX information and the sidelink identifier of the second terminal.

Figure 10:
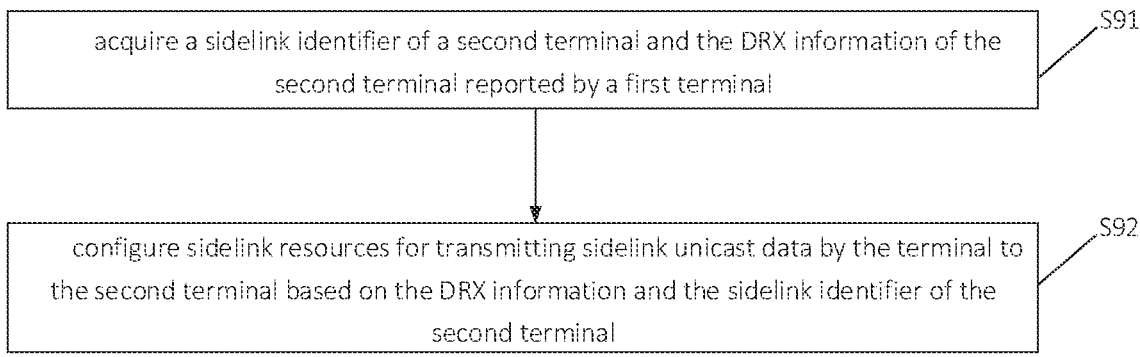
FIG. 10 is a flowchart illustrating a sidelink data transmission method in accordance with an embodiment of the disclosure.

FIG. 10 is a flowchart illustrating a sidelink data transmission method in accordance with an embodiment of the disclosure. As illustrated in FIG. 10, the sidelink data transmission method is applied to a network device and includes the following steps.

In step S91, a sidelink identifier of a second terminal and DRX information of the second terminal reported by a first terminal are acquired.

In step S92, sidelink resources for transmitting sidelink data by the first terminal to the second terminal are configured based on the DRX information and the sidelink identifier of the second terminal.

In an implementation, the first terminal is in a connected state and the DRX information is applicable to a sidelink multicast reception. The network device can obtain a sidelink identifier of a multicast group where the second terminal is in and multicast DRX information reported by the first terminal, and configure the sidelink resources for transmitting sidelink multicast data by the first terminal to the second terminal based on the multicast DRX information and the sidelink identifier of the multicast group where the second terminal is in.

Figure 11:
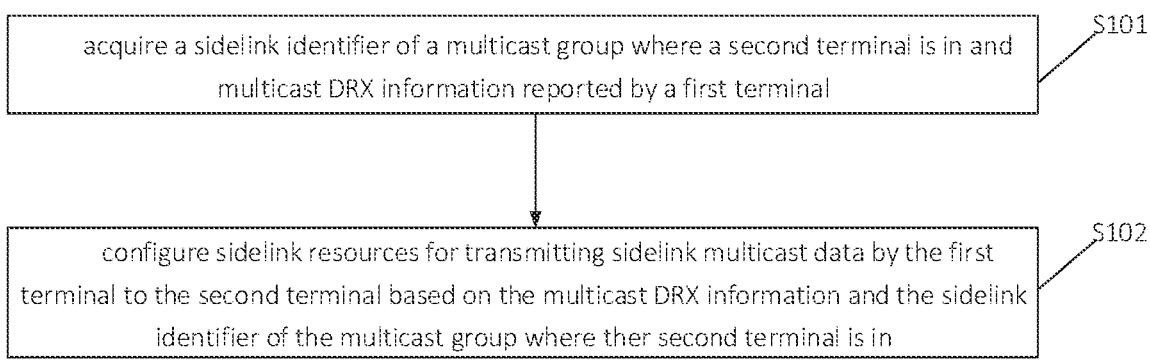
FIG. 11 is a flowchart illustrating a sidelink data transmission method in accordance with an embodiment of the disclosure.

FIG. 11 is a flowchart illustrating a sidelink data transmission method in accordance with an embodiment of the disclosure. As illustrated in FIG. 11, the sidelink data transmission method is applied to a network device and includes the following steps.

In step S101, a sidelink identifier of a multicast group where a second terminal is in and multicast DRX information reported by a first terminal are acquired.

In step S102, sidelink resources for transmitting sidelink multicast data by the first terminal to the second terminal are configured based on the multicast DRX information and the sidelink identifier of the multicast group where the second terminal is in.

In an implementation, the network device may broadcast one or more sets of DRX parameters and one or more sidelink resource pools. Each sidelink resource pool is associated with at least one set of DRX parameters to allow the first terminal in the idle state or the inactive state to select a sidelink resource pool associated with the DRX parameter from one or more sidelink resource pools broadcasted by the network device.

It is understandable that the sidelink data transmission method according to embodiments of the disclosure can be applied to the interaction process between the first terminal, the second terminal, and the network device. The implementations of the interaction process can refer to the relevant description of the foregoing embodiment, which are not repeated here.

In the sidelink data transmission method according to embodiments of the disclosure, in determining the sidelink resources used for transmitting data by the first terminal to the second terminal, the sidelink resources are determined based on the DRX information of the second terminal, which can avoid sending the sidelink data during the sleeping time of the second terminal, thereby avoiding data loss.

In embodiments of the disclosure, the above-mentioned sidelink data transmission method will be described below in conjunction with examples.

In an example, assuming that the second terminal is terminal A. and the first terminal is terminal B. The sidelink Layer 2 identifier of the terminal A is 001, and the sidelink Layer 2 identifier of the terminal B is 002. The sidelink Layer 2 identifier of a sidelink group is 100, and the group includes the terminal A and a terminal C that serving as the first terminal. In this example, the terminal A and the terminal B have established a sidelink unicast connection, and the terminal A is in the sidelink group 100.

The network device configures the following DRX parameters for the terminal A: inactivity timer being 3 ms, on-duration timer being 2 ms, cycle being 5 ms, start offset being 0 ms, and being applicable to all unicast connections: and inactivity timer being 5 ms, on-duration timer being 1 ms, cycle being 10 ms, start offset being 5 ms, and being applicable to the sidelink group 100.

The terminal A transmits the DRX configuration (i.e. inactivity timer being 3 ms, the on-duration timer being 2 ms, the cycle being 5 ms, the start offset being 0 ms) and the sidelink Layer 2 identifier, i.e. 001, of terminal A through a broadcast message. In addition, the terminal A transmits the DRX parameters (i.e. the inactivity timer being 5 ms, the on-duration timer being 1 ms, the cycle being 10 ms, and the start offset being 5 ms) and the sidelink Layer 2 identifier, i.e. 100, of the group to the entire group through multicast.

The terminal B in the connected state receives the broadcast message transmitted by the terminal A. After checking that the unicast connection between terminal B and terminal A has been established, the terminal B reports the DRX configuration (i.e. the inactivity timer being 3 ms, the on-duration timer being 2 ms, the cycle being 5 ms, and the start offset being isms) and the sidelink Layer 2 identifier, i.e. 001, of terminal A to the network device.

The terminal C in the connected state receives the broadcast message transmitted by terminal A. After checking that the unicast connection between terminal C and terminal A has not been established, the terminal C stores the DRX configuration (i.e. the inactivity timer being 3 ms, the on-duration timer being 2 ms, the cycle being 5 ms, and the start offset being 0 ms) of terminal A. When receiving a multicast message transmitted by the terminal A, the terminal C applies the DRX configuration (i.e. the inactivity timer being 5 ms, the on-duration timer being 1 ms, the cycle being 10 ms, and the start offset being 5 ms) to the reception of the group 100 and reports the DRX configuration (i.e. the inactivity timer being 5 ms, the on-duration timer being 1 ms, the cycle being 10 ms, and the start offset being 5 ms) and the sidelink Layer 2 identifier, i.e. 100, of the group to the network device.

In another example, the second terminal is terminal A, and the first terminal is terminal B. The sidelink Layer 2 identifier of the terminal A is 001, and the sidelink Layer 2 identifier of the terminal B is 002. In this example, the terminal A and the terminal B have established a sidelink unicast connection.

The network device carries the following DRX information in the broadcast message broadcasted by the cell where the terminal B is located:

First DRX information: The inactivity timer being 3 ms, the on-duration timer being 2 ms, the cycle being 5 ms, and the start offset being 0 ms.

Second DRX information: The inactivity timer being 5 ms, the on-duration timer being 1 ms, the cycle being 10 ms, and the start offset being 5 ms.

The network device also carries information associated with sidelink resource pools in the broadcast message broadcasted by the cell where the terminal B is located. The sidelink resource pool 1 is associated with the first DRX information, and the sidelink resource pool 2 is associated with the second DRX information.

The network device configures the following DRX parameters for the terminal A: the inactivity timer being 3 ms, the on-duration timer being 2 ms, the cycle being 5 ms, the start offset being 0 ms, being applicable to the unicast connection with terminal B.

The terminal A transmits the DRX information (i.e. the inactivity timer being 3 ms, the on-duration timer being 2 ms, the cycle being 5 ms, the start offset being 0 ms) to the terminal B through a unicast message. The terminal B in the idle state receives the unicast message transmitted by the terminal A, and selects a sidelink resource pool, such as the sidelink resource pool 1, associated with the DRX information (i.e. the inactivity timer being 3 ms, the on-duration timer being 2 ms, the cycle being 5 ms, the start offset being 0 ms) in the broadcast message of the network device and transmits the sidelink data to the terminal A through the sidelink resource pool 1.

Based on the same concept, embodiments of the disclosure further provide a sidelink data transmission device.

It is understandable that, in order to realize the above-mentioned functions, the sidelink data transmission device according to embodiments of the disclosure includes hardware structures and/or software modules corresponding to each function. In combination with the units and algorithm steps of the examples disclosed in embodiments of the disclosure, the embodiments of the disclosure can be implemented in the form of hardware or a combination of hardware and computer software. Whether a certain function is executed by hardware or computer software-driven hardware depends on the specific application and design constraint conditions of the technical solution. Those skilled in the art can use different methods to implement the described functions for each specific application, but such implementation should not be considered as going beyond the scope of the technical solutions of the embodiments of the disclosure.

Figure 12:
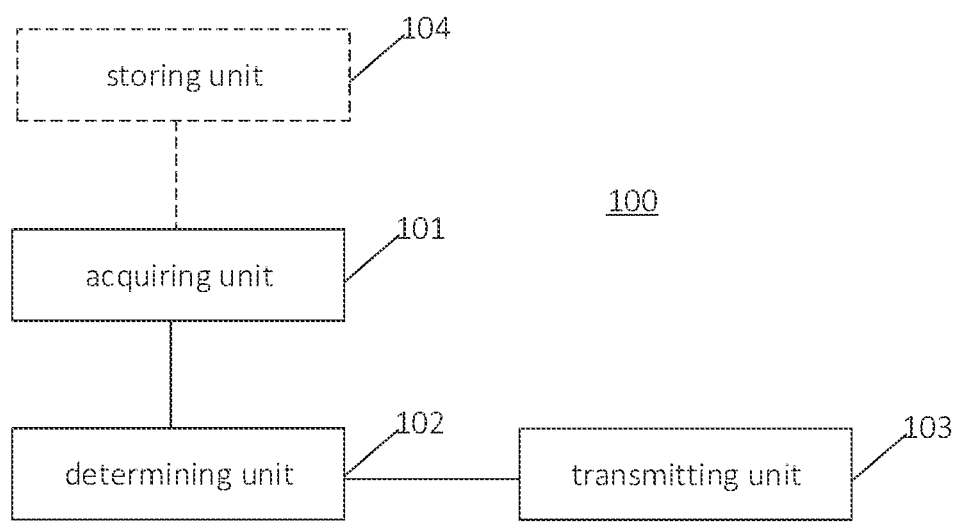
FIG. 12 is a block diagram illustrating a sidelink data transmission device in accordance with an embodiment of the disclosure.

FIG. 12 illustrates a sidelink data transmission device in accordance with an embodiment of the disclosure. As illustrated in FIG. 12, the sidelink data transmission device 100 is applied to a first terminal and includes an acquiring unit 101, a determining unit 102, and a transmitting unit 103.

The acquiring unit 101 is configured to acquire discontinuous reception (DRX) information transmitted by the second terminal. The determining unit 102 is configured to determine the sidelink resources based on the DRX information. The transmitting unit 103 is configured to transmit sidelink data to the second terminal based on the sidelink resources.

In an implementation, the first terminal is in a connected state, and the DRX information is applicable to a sidelink unicast reception. The transmitting unit 103 is further configured to report a sidelink identifier of the second terminal and the DRX information of the second terminal to a network device. The determining unit 102 is configured to determine the sidelink resources based on the DRX information by: determining sidelink resources configured by the network device based on the DRX information and the sidelink identifier of the second terminal as the sidelink resources for transmitting sidelink unicast data to the second terminal.

In another implementation, the first terminal is in an idle state or an inactive state, and the DRX information is applicable to a sidelink unicast reception. The determining unit 102 is configured to determine the sidelink resources based on the DRX information by: selecting a sidelink resource pool associated with the DRX information from sidelink resource pools broadcasted by a network device as sidelink resources for transmitting sidelink unicast data to the second terminal.

In yet another implementation manner, the determining unit 102 is further configured to: in response to there being no sidelink resource pool associated with DRX information in sidelink resource pools broadcasted by a network device, trigger the first terminal to enter a connected state and determine sidelink resources configured by network device based on the DRX information of the second terminal and the Sidelink identifier of the second terminal as the sidelink resources for transmitting sidelink unicast data to the second terminal.

In yet another implementation, the first terminal is in a connected state, and the DRX information is applicable to a sidelink multicast reception. The transmitting unit 103 is further configured to report a sidelink identifier of a multicast group where the second terminal is in and multicast DRX information to a network device. The determining unit 102 is configured to determine the sidelink resources based on the DRX information by: determining sidelink sources configured by the network device based on the DRX information and the sidelink identifier of the multicast group where the second terminal is in as the sidelink resources for transmitting sidelink multicast data to the second terminal.

In yet another implementation, the first terminal is in an idle state or an inactive state, and the DRX information is applicable to a sidelink multicast reception. The determining unit 102 is configured to determine the sidelink resources based on the DRX information by: selecting a sidelink resource pool associated with the DRX information from sidelink resource pools broadcasted by the network device as the sidelink resources for transmitting sidelink multicast data to the second terminal.

In yet another implementation, the determining unit 102 is further configured to: in response to there being no sidelink resource pool associated with DRX information in sidelink resource pools broadcasted by a network device, trigger the first terminal to enter a connected state and determine sidelink sources configured by the network device based on the DRX information of the second terminal and the sidelink identifier of the multicast group where the second terminal is in as sidelink resources for transmitting sidelink multicast data to the second terminal.

In yet another implementation, the sidelink data transmission device 100 further includes a storing unit 104 configured to: in response to the DRX information being applicable to all sidelink receptions and a unicast connection not being established between the first terminal and the second terminal, store the DRX information and the sidelink identifier of the second terminal, and associate the DRX information with a sidelink of the second terminal.

In yet another implementation, the DRX information is applicable to all sidelink receptions. The determining unit 102 is configured to determine the sidelink resources based on the DRX information by: in response to an unicast connection being established between the first terminal and the second terminal and the first terminal being in a connected state, determining sidelink resources configured by the network device based on the DRX information and the sidelink identifier of the second terminal as sidelink resources for transmitting sidelink unicast data to the second terminal; and in response to a unicast connection being established between the first terminal and the second terminal and the first terminal being in an idle state or in an inactive state, selecting a sidelink resource pool associated with the DRX information from sidelink resource pools broadcasted by the network device as the sidelink resource for transmitting sidelink unicast data to the second terminal.

Figure 13:
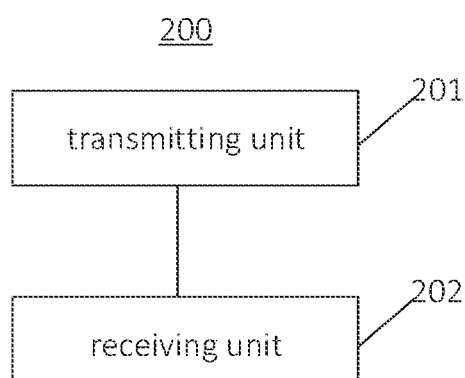
FIG. 13 is a block diagram illustrating a sidelink data transmission device in accordance with an embodiment of the disclosure.

FIG. 13 illustrates a sidelink data transmission device in accordance with an embodiment of the disclosure. As illustrated in FIG. 13, the sidelink data transmission device 200 is applied to the second terminal and includes a transmitting unit 201 and a receiving unit 202.

The transmitting unit 201 is configured to transmit discontinuous reception (DRX) information of the second terminal to the first terminal. The receiving unit is configured to receive sidelink data transmitted by the first terminal on sidelink resources determined based on the DRX information.

In an implementation, the DRX information is applicable to a sidelink unicast reception. The transmitting unit 201 is configured to transmit the DRX information of the second terminal to the first terminal by: transmitting the DRX information applicable to the sidelink unicast reception to the first terminal based on a unicast message.

In another implementation, the DRX information is applicable to a sidelink multicast reception. The transmitting unit 201 is configured to transmit the DRX information of the second terminal to the first terminal by: transmitting the DRX information applicable to the sidelink multicast reception to the first terminal based on a multicast message.

In yet another implementation, the DRX information is applicable to all sidelink receptions. The transmitting unit 201 is configured to transmit the DRX information of the second terminal to the first terminal by: transmitting the DRX information applicable to all sidelink receptions to the first terminal based on a broadcast message.

Figure 14:
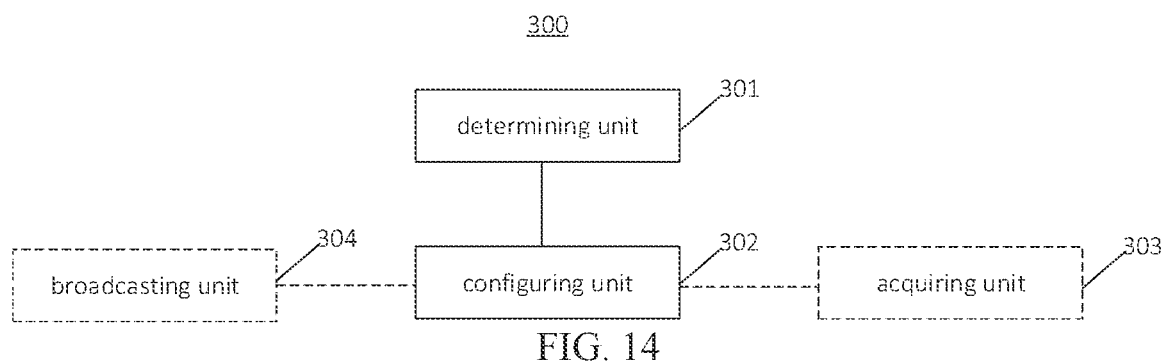
FIG. 14 is a block diagram illustrating a sidelink data transmission device in accordance with an embodiment of the disclosure.

FIG. 14 illustrates a sidelink data transmission device in accordance with an embodiment of the disclosure. As illustrated in FIG. 14, the sidelink data transmission device 300 is applied to a network device and includes a determining unit 301 and a configuring unit 302.

The determining unit 301 is configured to determine DRX information. The DRX information is transmitted by a second terminal to a first terminal. The configuring unit 302 is configured to configure sidelink resources based on the DRX information. The Sidelink resources are used for transmitting sidelink data by the first terminal to the second terminal.

In an implementation, the first terminal is in a connected state, and the DRX information is applicable to a sidelink unicast reception. The sidelink data transmission device 300 further includes an acquiring unit 303 configured to acquire DRX information of the second terminal and a sidelink identifier of the second terminal reported by the first terminal. The configuring unit 302 is configured to configure sidelink resources based on the DRX information by: configuring the sidelink resources for transmitting sidelink unicast data by the first terminal to the second terminal based on the DRX information and the sidelink identifier of the second terminal.

In another embodiment, the first terminal is in a connected state, and the DRX information is applicable to a sidelink multicast reception. The sidelink data transmission device 300 further includes an acquiring 303 configured to acquire a sidelink identifier of a multicast group where the second terminal is in and multicast DRX information reported by the first terminal. The configuring unit 302 is configured to configure the sidelink resources based on the DRX information by: configuring the sidelink resources for transmitting sidelink multicast data by the first terminal to the second terminal based on the multicast DRX information and the sidelink identifier of the multicast group where the second terminal is in.

In yet another implementation, the sidelink data transmission device 300 further includes a broadcasting unit 304 configured to broadcast one or more sets of DRX parameters and one or more DRX parameters in response to the first terminal being in an idle state or in an inactive state. Each sidelink resource pool is associated with at least one set of DRX parameters.

Regarding the device in the foregoing embodiments, the specific manner in which each module performs operation has been described in detail in the embodiment of the method, and detailed description will not be given here.

Figure 15:
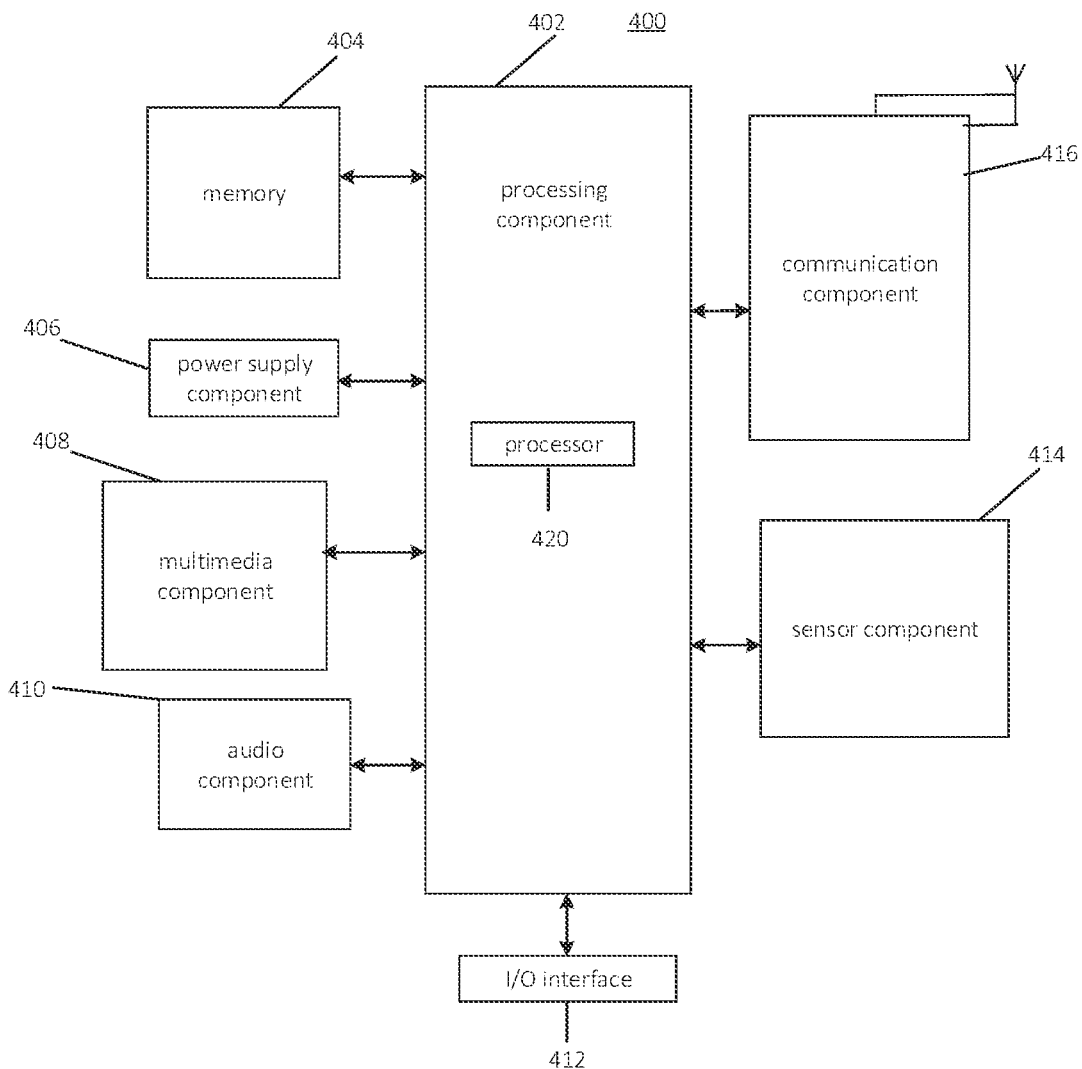
FIG. 15 is a block diagram illustrating a sidelink data transmission device in accordance with an embodiment of the disclosure.

FIG. 15 is a block diagram illustrating a sidelink data transmission device 400 in accordance with an embodiment of the disclosure. For example, the device 400 may be the first terminal or the second terminal involved in the implementations of the disclosure, such as a mobile phone, a computer, a digital broadcasting terminal, a messaging device, a game console, a tablet device, a medical device, a fitness device, or a personal digital assistant.

As illustrated in FIG. 15, the device 400 may include one or more of the following components: a processing component 402, a memory 404, a power supply component 406, a multimedia component 408, an audio component 410, an input/output (I/O) interface 412, a sensor component 414, and a communication component 416.

The processing component 402 generally controls the overall operations of the device 400, such as operations associated with display, telephone calls, data communications, camera operations, and recording operations. The processing component 402 may include one or more processors 420 to execute instructions to complete all or part of the steps of the foregoing method. In addition, the processing component 402 may include one or more modules to facilitate the interaction between the processing component 402 and other components. For example, the processing component 402 may include a multimedia module to facilitate the interaction between the multimedia component 408 and the processing component 402.

The memory 404 is configured to store various types of data to support the operation of the device 400. Examples of these data include instructions for operating any application or method on the device 400, contact data, phone book data, messages, pictures, videos, etc. The memory 204 can be implemented by any type of volatile or non-volatile storage device or a combination thereof, such as static random access memory (SRAM), electrically erasable programmable read-only memory (EEPROM), erasable and programmable read only memory (EPROM), programmable read only memory (PROM), read only memory (ROM), magnetic memory, flash memory, magnetic disk or optical disk.

The power supply component 406 provides power to various components of the device 400. The power supply component 406 may include a power management system, one or more power supplies, and other components associated with generating, managing, and distributing power for the device 400.

The multimedia component 408 includes a screen that provides an output interface between the device 400 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touch, swipe, and gestures on the touch panel. The touch sensor may not only sense the boundary of the touch or swipe action, but also detect the duration and pressure related to the touch or swipe action. In some embodiments, the multimedia component 408 includes a front-facing camera and/or a rear-facing camera. When the device 400 is in an operation mode, such as a shooting mode or a video mode, the front-facing camera and/or the rear-facing camera can receive external multimedia data. Each of the front-facing camera and rear-facing cameras can be a fixed optical lens system or have focal length and optical zoom capabilities.

The audio component 410 is configured to output and/or input audio signals. For example, the audio component 410 includes a microphone (MIC) that is configured to receive external audio signals when the device 400 is in operating modes, such as call mode, recording mode, and voice recognition mode. The microphone is configured to receive external audio signals. The received audio signal can be further stored in the memory 404 or sent via the the communication component 416. In some embodiments, the audio component 410 further includes a speaker for outputting audio signals.

The I/O interface 412 is configured to provide an interface between the processing component 402 and a peripheral interface module. The above-mentioned peripheral interface module may be a keyboard, a click wheel, a button, and the like. These buttons may include, but are not limited to: home button, volume button, start button, and lock button.

The sensor component 414 includes one or more sensors for providing status assessment of various aspects of the device 400. For example, the sensor component 414 can detect the on/off status of the device 400 and the relative positioning of components, such as the display and keypad of the device 400. The sensor component 414 can also detect a change in the position of the device 400 or a component of the device 400, the presence or absence of contact with the device 400, the orientation or acceleration/deceleration of the device 400 and the temperature change of the device 400. The sensor component 414 may include a proximity sensor configured to detect the presence of nearby objects in the absence of any physical contact. The sensor component 414 may also include a light sensor, such as a complementary metal oxide semiconductor (CMOS) or charge-coupled device (CCD) image sensor, for use in imaging applications. In some embodiments, the sensor component 414 may also include an acceleration sensor, a gyroscope sensor, a magnetic sensor, a pressure sensor, or a temperature sensor.

The communication component 416 is configured to facilitate wired or wireless communication between the device 400 and other devices. The device 400 can access a wireless network based on a communication standard, such as WiFi, 2G, or 3G. or a combination thereof. In some examples, the communication component 416 receives broadcast signals or broadcast related information from an external broadcast management system via a broadcast channel. In an example, the communication component 416 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In some examples, the device 400 may be implemented by one or more application specific integrated circuits (ASIC), digital signal processors (DSP), digital signal processing equipment (DSPD), programmable logic devices (PLD), field programmable A gate array (FPGA), controller, microcontroller, microprocessor, or other electronic component implementation for performing the above methods.

In an example, there is also provided a non-transitory computer-readable storage medium including instructions, such as a memory 404 including instructions. The instructions are executable by the processor 420 of the device 400 to perform the above method. For example, the non-transitory computer-readable storage medium may be ROM, random access memory (RAM), CD-ROM, magnetic tape, floppy disk, optical data storage device, and the like.

Figure 16:
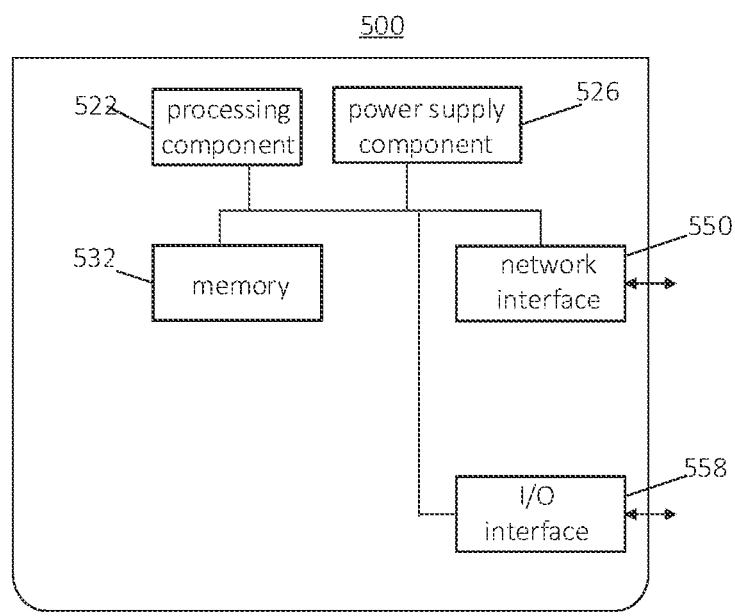
FIG. 16 is a block diagram illustrating a sidelink data transmission device in accordance with an embodiment of the disclosure.

FIG. 16 is a block diagram illustrating a sidelink data transmission device 500 in accordance with an embodiment of the disclosure. For example, the device 500 may be a server. As illustrated in FIG. 16, the device 500 includes a processing component 522 which further includes one or more processors, and a memory resource represented by a memory 532 for storing instructions that can be executed by the processing component 522, such as an application program. The application program stored in the memory 532 may include one or more modules each corresponding to a set of instructions. In addition, the processing component 522 is configured to execute instructions to perform the above-mentioned methods.

The device 500 may further include a power supply component 526 configured to perform power management of the device 500, a wired or wireless network interface 550 configured to connect the device 500 to the network, and an input/output (I/O) interface 558. The device 500 can operate based on an operating system stored in the memory 532, such as Windows Server™, Mac OS X™, Unix™, Linux™, FreeBSD™ or the like.

In some embodiments, a non-transitory computer-readable storage medium including instructions is further provided, such as the memory 532 including instructions. The instructions may be executed by the processing component 522 of the device 500 to perform the foregoing methods. For example, the non-transitory computer-readable storage medium may be ROM, random access memory (RAM), CD-ROM, magnetic tape, floppy disk, optical data storage device, etc.

It is understandable that in the disclosure, the term "plurality" refers to two or more than two, and other quantifiers are similar. The term "and/or" describes the association relationship of the associated object, indicating three types of relationships, for example only A, only B, or both A and B. The character "I" generally indicates that the associated objects before and after are in an "or" relationship. The singular forms "a", "said" and "the" are also intended to include plural forms, unless the context clearly indicates other meanings.

It is understandable that the terms "first". "second", etc. are used to describe various information, but the information should not be limited to these terms. These terms are only used to distinguish the same type of information from each other, and do not indicate a specific order or degree of importance. In fact, expressions such as "first" and "second" can be used interchangeably. For example, without departing from the scope of the disclosure, the first information may also be referred to as second information, and similarly, the second information may also be referred to as first information.

It is understandable that although the operations in embodiments of the disclosure are described in a specific order in the drawings, they should not be understood as requiring these operations to be performed in the specific order shown or in a serial order, or requiring to perform all the operations shown to get the desired result. In certain circumstances, multitasking and parallel processing may be advantageous.

Those skilled in the art will easily think of other embodiments of the disclosure after considering the specification and practicing the disclosure described herein. This disclosure is intended to cover any variations, uses, or adaptive changes of the disclosure. These variations, uses, or adaptive changes follow the general principles of the disclosure and include common knowledge or conventional technical means in the technical field that are not disclosed in the disclosure. The description and the embodiments are to be regarded as examples only, and the true scope and spirit of the disclosure are pointed out by the following claims.

It is understandable that the disclosure is not limited to the precise structure that has been described above and shown in the drawings, and various modifications and changes can be made without departing from its scope. The scope of the disclosure is only limited by the appended claims.

What is claimed is:

1. A sidelink data transmission method, performed by a first terminal, the method comprising:
   receiving, from a second terminal, discontinuous reception (DRX) information of the second terminal;
   determining sidelink resources based on the DRX information;
   transmitting sidelink data to the second terminal based on the sidelink resources and
   sending a sidelink identifier of the second terminal and the DRX information of the second terminal to a network device, wherein the first terminal is in a connected state and the DRX information is applicable to a sidelink unicast reception,
   wherein determining sidelink resources based on the DRX information comprises:
      determining sidelink resources configured by the network device for the first terminal, wherein the sidelink resources are configured by the network device based on the DRX information and the sidelink identifier of the second terminal, and the sidelink resources are configured for transmitting sidelink unicast data to the second terminal.

2. The method of claim 1, wherein the first terminal is in an idle state or in an inactive state, and the DRX information is applicable to a sidelink unicast reception;
wherein determining the sidelink resources based on the DRX information comprises:
selecting a sidelink resource pool associated with the DRX information from sidelink resource pools broadcasted by a network device as the sidelink resources for transmitting sidelink unicast data to the second terminal.

3. The method of claim 2, further comprising:
triggering the first terminal to enter a connected state; and
determining sidelink resources configured by the network device based on the DRX information of the second terminal and the sidelink identifier of the second terminal, as the sidelink resources for transmitting the sidelink unicast data to the second terminal;
wherein there is no sidelink resource pool associated with the DRX information in the sidelink resource pools broadcasted by the network device.

4. The method of claim 1, wherein receiving the DRX information of the second terminal comprises:
acquiring the DRX information applicable to the sidelink unicast reception based on a unicast message transmitted by the second terminal.

5. The method of claim 1, wherein the first terminal is in an idle state or in an inactive state, and the DRX information is applicable to a sidelink multicast reception;
wherein determining sidelink resources based on the DRX information comprises:
selecting a sidelink resource pool associated with the DRX information from sidelink resource pools broadcasted by a network device as the sidelink resources for transmitting sidelink multicast data to the second terminal.

6. The method of claim 1, wherein the DRX information comprises DRX parameters.

7. The method of claim 6, wherein the DRX information further comprises one or both of a sidelink identifier of the first terminal and a sidelink identifier of the second terminal.

8. A sidelink data transmission device, comprising:
a processor; and
a memory configured to store instructions executable by the processor;
wherein the processor is configured to perform the method of claim 1.

9. A sidelink data transmission method, performed by a second terminal, the method comprising:
transmitting discontinuous reception (DRX) information of the second terminal to a first terminal; and
receiving sidelink data transmitted by the first terminal on sidelink resources determined based on the DRX information, wherein the sidelink resources are configured by a network device based on the DRX information and a sidelink identifier of the second terminal, and the DRX information is applicable to a sidelink unicast reception,
wherein transmitting DRX information of the second terminal to the first terminal comprises:
transmitting DRX information applicable to the sidelink unicast reception to the first terminal based on a unicast message.

10. A sidelink data transmission device, comprising:
a processor; and
a memory configured to store instructions executable by the processor;
wherein the processor is configured to perform the method of claim 9.

11. The method of claim 9, wherein the DRX information comprises DRX parameters.

12. The method of claim 11, wherein the DRX information further comprises one or both of a sidelink identifier of the first terminal and a sidelink identifier of the second terminal.

13. A sidelink data transmission method, performed by a network device, the method comprising:
determining discontinuous reception (DRX) information, wherein the DRX information is transmitted by a second terminal to a first terminal;
configuring sidelink resources based on the DRX information, wherein the sidelink resources are configured to transmit sidelink data by the first terminal to the second terminal; and
receiving a sidelink identifier of the second terminal and the DRX information of the second terminal sent by the first terminal, wherein the first terminal is in a connected state and the DRX information is applicable to a sidelink unicast reception,
wherein configuring the sidelink resources based on the DRX information comprises:
configuring, for the first terminal, the sidelink resources based on the DRX information and the sidelink identifier of the second terminal, wherein the sidelink resources are used by the first terminal to transmit sidelink unicast data to the second terminal.

14. The method of claim 13, wherein the first terminal is in an idle state or an inactive state; and the method further comprises:
broadcasting one or more sets of DRX parameters and one or more sidelink resource pools, wherein each sidelink resource pool is associated with at least one set of DRX parameters.

15. A sidelink data transmission device, comprising:
a processor; and
a memory configured to store instructions executable by the processor;
wherein the processor is configured to perform the method of claim 13.

16. The method of claim 13, wherein the DRX information comprises DRX parameters.

17. The method of claim 16, wherein the DRX information further comprises one or both of a sidelink identifier of the first terminal and a sidelink identifier of the second terminal.

* * * * *